UNITED STATES PATENT OFFICE.

WILLIAM H. PULSIFER, OF ST. LOUIS, MISSOURI, ASSIGNOR TO HIMSELF, AND SAMUEL J. COLEGATE, OF NEW YORK, N. Y.

MIXING WHITE LEAD WITH OIL.

SPECIFICATION forming part of Letters Patent No. 320,887, dated June 23, 1885.

Application filed December 24, 1884. (No specimens.)

*To all whom it may concern:*

Be it known that I, WILLIAM H. PULSIFER, a citizen of the United States, residing at St. Louis, in the State of Missouri, have invented a new and useful process of mixing linseed-oil or other oils with white lead and separating water therefrom; and I do hereby declare that the following is a full, clear, and exact description of the invention, which will enable others skilled in the art to which it appertains to make and use the same.

Heretofore white lead has been mixed with linseed-oil by first grinding the lead, decomposed by acid in water, and in a wet state, beposed between burr-stones; second, washing in water and running it into settling-tubs, and running off the water after the lead has settled; third, placing the pulp that remained upon metal drying-tables heated by steam, and driving off the water by evaporation, this drying process lasting from six to eight days, and leaving with the dry white lead whatever impurities had existed in the water which had been evaporated; fourth, removing the dry powder of white lead from the steam-tables to bins, and thence again removing it, while still in powder, to mixing-tubs with revolving rollers, in which a small portion of oil was rolled into it; thence it was again removed to other tubs with revolving arms, and more oil added and mixed with the white lead; fifth, grinding the white lead and oil mixed together between burr-stones or rollers, thus thoroughly combining them in a smooth compound ready for packing, and forming the commercial article known as "white lead ground in oil."

The object of my invention is to form a better commercial article by a much simpler process, which enables me to dispense with one step of the old process entirely—namely, the drying step—and, instead of the cumbrous process of mixing, heretofore used, to mix the oil directly with the wet pulp as it comes from the settling-tubs, in a suitable mixing-vessel.

The advantages of this new process consist in the omission of the long and expensive drying process, and in avoiding the necessity of removing the dry powder of white lead from the drying-tables to bins, and thence to the mixing-tubs. This latter step in the old process is extremely injurious to workmen, as the air is filled with fine particles of lead, and colic and lead-paralysis often result from their inhalation; consequently high wages must be paid for this work. My process also saves not only the six or eight days' work required for drying, but also the time consumed in handling the dry powder, and the product is free from the impurities that were contained in the water formerly evaporated, and the combined lead and oil seems to make a better commercial product than by the old process, as it keeps its whiteness longer when made into paint and used as such, and the mass of white lead and oil when packed does not skin over as soon as did the white lead ground in oil by the old process.

It is found in practicing my process that when the oil is thoroughly mixed with a wet pulp composed of water and white lead the oil and lead will combine together and drive out the water, so that, practically, all the lead and oil will remain in combination at the bottom of the mixing-vessel, and, practically, all the water, with the impurities in solution, will be at the top; and it is also discovered that the particles of lead when in wet pulp are so separated by the particles of water that when the oil drives off the water and unites with the lead it forms a perfectly smooth mass that does not require regrinding between the burr-stones or rollers. This subsequent grinding or passing between burr-stones is, however, sometimes resorted to, as it results in giving an additional gloss to the article.

To carry my invention into effect I pour the pulp or sediment from the settling-tubs, which pulp usually contains about three volumes of water to one of white lead, in a suitable mixer or receptacle with revolving arms, and I pour in with it a suitable quantity of linseed-oil or other oil, preferably about eight parts, by weight, of oil to ninety-two parts, by weight, of white lead contained in the pulp. I then stir the compound thoroughly until the lead has united with the oil by molecular affinity, and until, practically, all the water is driven from the white lead and stands in the receptacle upon the top of the combined oil and white lead. When the mixing process is finished, the lead, combined with the oil, lies at the bottom of the vessel, with a distinct line of demarkation between it and the water. The mixing process may be completed after about from one hour to two hours in a mixing-vessel capable of holding about two tons of the pulp and oil. The said receptacle is provided with suitable taps or cocks for drawing off the water at different heights. Through these the clear water is all drawn off, and more white lead and oil are put in its place; and the white lead and oil, which are thoroughly mixed and ready for the market as white lead ground in oil, are taken from the bottom of the mixing-vessel through a suitable opening and placed in the usual kegs, casks, or cans.

I do not here lay claim to any particular form of mixing-receptacle, as any suitable receptacle can be used in which the oil and lead can combine by agitation and the water be separated.

I am aware that oil has formerly been mixed with damp white lead, and the water then driven off by evaporation. My process differs from this by employing a wet pulp and driving off the water by agitation.

I am also aware that water-paints have been made in which water and oil are both mixed with dry lead, so as to form a cheap paint. The process herein described differs from this, because in my process the lead is in the condition of wet pulp before the oil is added, and because the water is driven from the mixture by agitation. I do not here claim the article produced by this process; but I intend to make a separate application for Letters Patent for the same.

What I claim as my invention, and desire to secure by Letters Patent, is—

1. The process of mixing by agitation a liquid pulp of white lead and water with oil until the water is expelled and the oil and lead are thoroughly incorporated, substantially as described.

2. The process of manufacturing white lead mixed with oil by the following steps, in the following order, viz: first, forming a liquid pulp of white-lead water; second, adding oil thereto in a suitable receptacle; third, agitating the material until the oil is combined with the lead and the water is separated; fourth, drawing off the water, substantially as described.

3. The process of manufacturing white lead mixed with oil by the following steps in the following order, viz: first, forming a liquid pulp of white lead and water; second, adding oil thereto in a suitable receptacle; third, agitating the material until the oil is combined with the lead and the water is expelled, substantially as described.

W. H. PULSIFER.

Witnesses:
C. D. GREENE, Jr.,
CORNELIA B. PULSIFER.